(12) United States Patent
Williamson et al.

(10) Patent No.: US 7,640,846 B2
(45) Date of Patent: Jan. 5, 2010

(54) DIVERTER VALVE AND CHANNEL FOR BREWED BEVERAGE MAKER

(75) Inventors: Steve Williamson, Arvonia, VA (US); William D. Starr, Richmond, VA (US); David Hawks, Glen Allen, VA (US); Rong Liu, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 581 days.

(21) Appl. No.: 11/426,392

(22) Filed: Jun. 26, 2006

(65) Prior Publication Data

US 2007/0295216 A1 Dec. 27, 2007

(51) Int. Cl.
*A47J 31/46* (2006.01)
*A47J 31/58* (2006.01)

(52) U.S. Cl. .......................... 99/305; 99/300; 99/323.3; 222/146.5; 222/505

(58) Field of Classification Search ........................ None
See application file for complete search history.

(56) References Cited

U.S. PATENT DOCUMENTS

| | | | |
|---|---|---|---|
| 4,142,840 A | 3/1979 | Kemp | |
| 4,414,884 A | 11/1983 | McLean | |
| 5,251,541 A | 10/1993 | Anson et al. | |
| 5,370,040 A | 12/1994 | Andrew et al. | |
| 5,377,299 A | 12/1994 | Anson et al. | |
| 5,964,141 A | 10/1999 | Andrew et al. | |
| 6,009,793 A * | 1/2000 | Blankenship et al. | 99/307 |
| 6,101,924 A * | 8/2000 | Blankenship et al. | 99/299 |
| 6,164,191 A | 12/2000 | Liu et al. | |
| 6,267,046 B1 | 7/2001 | Wanat | |
| 6,298,770 B1 * | 10/2001 | Blankenship et al. | 99/304 |
| 7,461,586 B2 * | 12/2008 | Garman et al. | 99/307 |
| 2003/0066431 A1 | 4/2003 | Fanzutti et al. | |
| 2005/0011364 A1 | 1/2005 | Chen et al. | |
| 2005/0076789 A1 | 4/2005 | Tebo, Jr. | |
| 2005/0247204 A1 | 11/2005 | Lafond | |
| 2008/0216667 A1 * | 9/2008 | Garman et al. | 99/304 |

\* cited by examiner

*Primary Examiner*—Joseph M Pelham
(74) *Attorney, Agent, or Firm*—Thomas, Raring & Teague, P.C.

(57) ABSTRACT

The invention relates to a brewed beverage maker with a diverter valve assembly placed between a heater and a showerhead, the diverter valve assembly fluidly connected to both the heater and showerhead. Opening the beverage maker during a brew cycle automatically causes at least a portion of the fluid passing through the diverter valve assembly to be diverted to a channel that directs the fluid to a point downstream of the showerhead in the brew cycle. In one embodiment of the invention, the diverted fluid is directed to a filter basket. The channel may optionally include a basin to collect and direct the diverted fluid. The outlet of the diverter valve assembly may form the showerhead.

15 Claims, 2 Drawing Sheets

DIVERTER VALVE AND CHANNEL FOR BREWED BEVERAGE MAKER

FIELD OF THE INVENTION

The present invention relates to a brewed beverage maker having a lid and a showerhead wherein the showerhead is rotatably connected to the coffee maker thereby allowing a user to rotate the showerhead in order to add, remove, or otherwise access a filter or brew basket, and, more particularly, pertains to a selectively opened diverter valve and a fluid channel for use with such a brewed beverage maker.

BACKGROUND

Hot or brewed beverage makers, such as coffee makers, have been known and sold for many years using various brewing techniques. The typical and traditional coffee maker includes a stand or tower that has a warming plate forming the bottom or base of the tower with a filter basket located above the warming plate. The interior of the tower defines, at least in part, a fresh water reservoir. It is also possible to include a selectively removable fresh water reservoir. Such coffee makers further include a fluid reservoir that rests on the warming plate beneath the filter basket.

In use, an operator fills the fresh water reservoir with water and, if applicable, places the fresh water reservoir on the stand. Once the beverage maker is activated, the water in the fresh water reservoir flows to a heater that heats the water to boiling or near-boiling temperatures. As the water or steam expands, it travels upwards through a hot water tube. The hot water tube is fluidly connected to a showerhead positioned above the filter basket.

The hot water or steam is ejected from the showerhead where it then passes through the filter basket containing an infusible material. The heated fluid is infused with the essence of the infusible material to create a brewed beverage. The brewed beverage flows from the basket into the fluid reservoir via gravity. The beverage is maintained at an elevated temperature on the warming plate upon which the fluid reservoir rests.

In a traditional brewed beverage maker, the filter basket is selectively inserted into or removed from the hot beverage maker in a horizontal relationship. Therefore, it is not required to move the showerhead. In a more modern variation, a hinged lid allows access to the filter basket from the top of the beverage maker. Infusible material can be added to the filter basket without moving the filter basket. The showerhead is also connected to the coffee maker by a hinge. The showerhead is often connected to the lid so that both elements move simultaneously upon the opening of the lid. Different types of coffee makers include this general idea of a swinging showerhead.

A problem exists in that an operator may unwisely open the lid or otherwise expose the showerhead during a brew cycle. As a result, hot water and/or steam might be ejected from the showerhead or have other unintended consequences. One solution has been to have a flap, valve, or some other structure to stop or redirect the water or steam traveling in the hot water tube back into the fresh water reservoir. However, in the case of a removable fresh water reservoir, such a feature has been lacking.

Therefore, there exists a need for a new apparatus for diverting heated water or steam in a brewed beverage maker. Ideally, the new approach would be operable with all types of brewed beverage containers including those with removable fresh water reservoirs. The structure of a diverter valve and channel in accordance with the present invention will solve one or more of these or other needs.

SUMMARY OF THE INVENTION

In accordance with the present invention, a hot water or steam diverter valve for a brewed beverage maker is provided. The valve is selectively biased between an opened position and a closed position. In the closed position, heated fluid in the brewed beverage maker travels from a heater through a hot water conduit, the diverter valve assembly, and a showerhead where it then interacts with an infusible material held in a filter basket. In the open position, the diverter valve operates in conjunction with a fluid channel to redirect at least a portion of the heated fluid traveling through the diverter valve assembly so as to bypass the showerhead. The diverted fluid is transmitted to a point downstream of the showerhead in the brew cycle. The diverter valve assembly is connected to a lid that opens to allow access to the filter basket. The diverter valve is automatically biased to the open position upon the opening of the lid. The diverter valve of the present invention is operable with brewed beverage makers with or without removable fresh water reservoirs.

The diverter valve assembly can comprise any number of suitable structural parts. In accordance with one embodiment of the present invention, the diverter valve assembly includes a first conduit member fluidly connected to the hot water conduit or tube. The first conduit member includes an inlet and an outlet with a first intermediate opening. A second conduit member is in fluid connection with the first conduit member. The second conduit member includes an inlet and an outlet with a second intermediate opening. The outlet of the second conduit member can lead to or form the showerhead that is used to transmit heated fluid to the filter basket.

The first and second conduits are arranged in a partially nested relationship wherein the second conduit portion is rotatable relative to the first conduit portion. The diverter valve assembly is in the closed position when the first and second intermediate openings are not aligned and do not partially overlap. Rotating or biasing the diverter valve assembly to the open position involves the first and second intermediate openings being aligned or at least partially overlapping.

In the open position where the first and second openings at least partially overlap or are aligned, at least a portion of the heated fluid traveling through the diverter assembly is directed into a fluid channel. The fluid channel transmits the diverted heated fluid to a point downstream of the showerhead in the brewed beverage cycle. In a preferred embodiment, the diverted fluid is directed to the filter basket. In another preferred embodiment, the diverted fluid is directed to a brewed beverage tank, such as a carafe or a keep warm tank. Other variations exist, but the diverted fluid is not ejected from the showerhead.

In another embodiment of the present invention, the filter basket is securely and selectively held proximate to the channel outlet via a tab-and-receiver arrangement. The filter basket, in this embodiment, includes a tab that engages a specifically shaped receiver. When engaged, the receiver holds the tab, and thus the filter basket, in a proper alignment to receive fluid from the channel. The tab can act as an extension or bridge that reduces leakage between the channel outlet and the filter basket.

In use, an operator begins the brew cycle of the brewed beverage maker with the lid of the brewed beverage maker in the closed position. The diverter valve is, therefore, also in the closed or sealed position. Heated fluid moves through the diverter valve assembly to be elected from the showerhead into the filter basket. Opening the brewed beverage maker lid biases the diverter valve assembly into the open position.

A diverter valve and fluid channel in accordance with the present invention efficiently addresses at least one of the shortcomings associated with the prior art. For example, the diverter valve and fluid channel are operable with brewed beverage makers that have removable fresh water reservoirs. Instead of shifting diverted fluid back in the brew process cycle to the fresh water reservoir, the diverted fluid is directed by the channel to a point downstream of the showerhead. The foregoing and additional features and advantages of the present invention will become apparent to those of skill in the art from the following detailed description of a preferred embodiment taken in conjunction with the accompanying drawings.

DETAILED DESCRIPTION

A diverter valve assembly and fluid channel for use with a brewed beverage maker in accordance with the present invention provide an improved method and apparatus for reducing the risk of accidental ejection of a heated fluid from the brewed beverage maker. The diverter valve and channel constructions are also operable with brewed beverage makers that include integrated or removable fresh water reservoirs.

As with traditional, automatic drip coffee makers, a brew cycle includes several steps in order. First, fresh water is heated in a hot water heater. Second, the heated water passes through a hot water conduit to a diverter valve. Assuming that the diverter valve is closed, the hot water then passes through the diverter valve and into a showerhead that is placed over a filter basket. The filter basket contains infusible material such as ground coffee. The heated water then passes through the infusible material and through a filter and the filter basket. Finally, the infused or brewed beverage is dispensed into a tank or carafe. If the diverter valve is open, diverted fluid is directed to the fresh water reservoir, which is backwards or "upstream" in the brew cycle. The foregoing brew cycle steps define, at least in part, a typical brew cycle.

Figure 1:
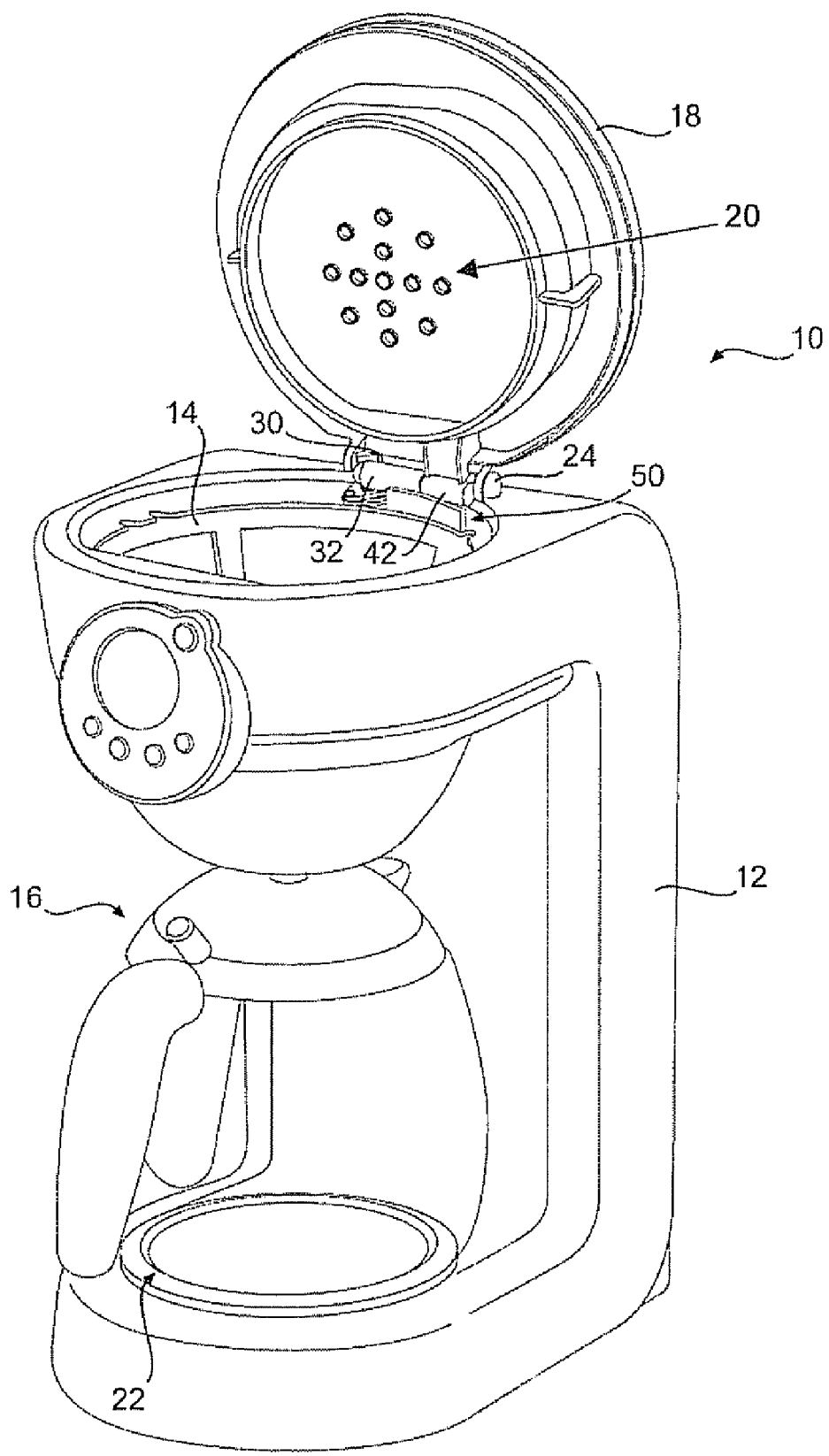
FIG. 1 is a perspective view of a brewed beverage maker including a rotatable brewed beverage maker lid and a showerhead in accordance with the present invention.

Turning to FIG. 1, there is illustrated a brewed beverage maker 10. Beverage or coffee maker 10 comprises a stand 12, a removable fresh water reservoir (not illustrated), a filter basket 14, a brewed beverage tank 16, a lid 18, and a showerhead 20. The stand 12 forms the base of coffee maker 10 and supports the reservoir and tank 16. Electronic controls, switches, displays and the like would be included (illustrated but not labeled). Overall, the specific construction and ornamental design of the beverage maker may vary. Therefore, a product designer or engineer having ordinary skill with the assembly and/or design of beverage makers will be able to create a beverage maker that incorporates the teachings of the present invention while incorporating a different look or different, alternative parts.

In the illustrated example, the fresh water reservoir would selectively connect or mount to the rear of beverage maker 10. Such a reservoir includes a selective fluid connection to the stand via a check valve. Removable fresh water reservoirs and the associated valving and piping are known in the art. It is also known to have stand 12 include an integrated reservoir that acts as the fresh water reservoir. In the latter embodiment, the shape and design of stand 12 is defined, at least in part, by the shape, construction, and size of the internally located fresh water reservoir. Integrated fresh water reservoirs are common in the art.

Brewed beverage tank 16 generally rests on stand 12 and can be opaque or clear. A warming plate 22 is operable to heat or keep warm the brewed beverage in tank 16. Typically, tank 16 will be a standard carafe that is selectively removable from stand 12. However, it is also known to include a beverage or keep warm tank 16 that dispenses fluid to another container without removing tank 16 from stand 12. Overall, tank 16 acts as a storage tank or a keep warm tank for a brewed beverage regardless of the structure or design of beverage maker 10.

Lid 18 is rotatably connected to stand 12 by a standard lid hinge 24. Lid 18 is illustrated in the up and open position. Showerhead 20 is also rotatably mounted to stand 12. The showerhead and lid are typically connected via a fastener, adhesive, connecting member, or the like so that the lid and showerhead rotate as a single unit. The showerhead of the present invention rotates relative to stand 12 via diverter valve assembly 30 (the showerhead may be integral to the diverter valve assembly). A channel 50 is located adjacent to the diverter valve assembly. An optional catch basin may be provided. Lid 18 is adapted to cover access to filter basket 14. Lid 18 can optionally cover the opening to the integrated fresh water reservoir, as applicable. It is also known to include individual lids to cover both the fresh water reservoir and the filter basket openings. In the case of a removable fresh water reservoir, the reservoir can optionally include a lid that does not mount to stand 12. Filter basket 14 is selectively mounted inside stand 12 above tank 16.

In the illustrated embodiment, a user adds an infusible material to filter basket 14 and fills the fresh water reservoir. The removable fresh water reservoir is mounted onto stand 12. The user then begins the brewing cycle by actuating the controls. Water then flows from the fresh water reservoir and through a heater (not illustrated), which is typically located beneath the warming plate 22. The heated fluid, which could include steam, then moves upwards through a hot water tube (also not illustrated) that terminates and is in fluid connection with diverter valve assembly 30. The operation and use of brewed beverage makers are generally known to one of skill in the art. The diverter valve and channel can operate with other types of brewed beverage makers other than the illustrated example.

Figure 2:
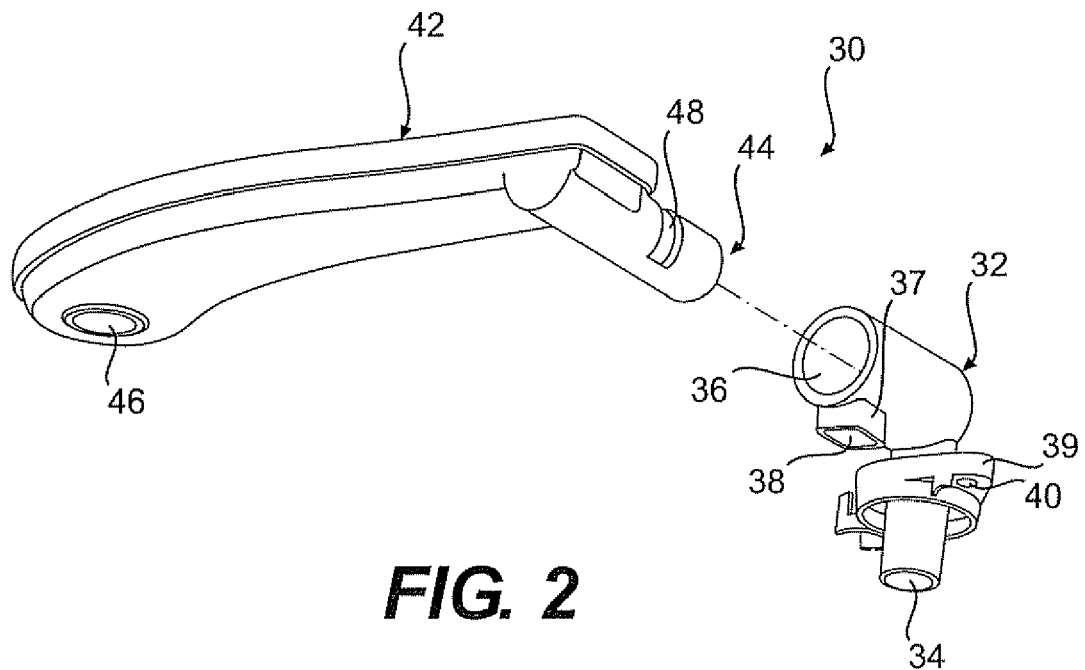
FIG. 2 is an exploded view of one embodiment of the diverter valve assembly of the present invention.

FIG. 2 illustrates diverter valve assembly 30 in an exploded relationship. A first conduit member 32 includes an inlet 34, outlet 36, and a first intermediate opening 38. Inlet 34 and outlet 36 are perpendicular to each other or, in other words, define conduits situated at a 90-degree angle. Inlet 34 engages and is fluidly connected to the hot water tube (not illustrated). Heated water flowing from the brewed beverage heater travels along the length of the first conduit portion from inlet 34 to outlet 36. A flange 39 provides a fastener aperture 40 through which a fastener can be inserted to mount first conduit portion 32 to stand 12. First conduit portion 32 could be mounted via a friction fit whereby flange 39 or inlet 34 is securely held on or in a lip or aperture. Other known mounting options are available.

A second conduit member 42 also includes an inlet 44, outlet 46, and a second intermediate opening 48. Inlet 44 and outlet 46 are also perpendicular to each other or, in other words, define conduits situated at a 90-degree angle. In the illustrated embodiment, inlet 44 is frictionally held within outlet 36 in a rotatable relationship. Outlet 46 can connect to a separate showerhead or it can act as showerhead 20 (i.e., the diverter valve assembly and showerhead are integral). In other words, outlet 46 can also be placed within the showerhead or in a fluid connection with the showerhead that would redistribute the flow to a plurality of showerhead apertures. In yet another preferred embodiment, second conduit portion 42 acts as the showerhead so that outlet 46 could be a plurality of openings operable to distribute heated fluid across an infusible material held in filter basket 14.

With lid 18 in the closed or down position, no portion of the apertures in the first and second conduits defined by intermediate openings 38, 48 are overlapping or aligned. Therefore, the only outlet for fluid entering diverter valve assembly 30 is outlet 46, and all of the heated fluid or steam that is transmitted through assembly 30 exits via outlet 46.

As a user lifts lid 18 to a partially or fully opened position, the segment of second conduit 42 that is inserted into first conduit 32 rotates relative to the first conduit. The rotation causes second intermediate opening 48 to come into alignment or to at least partially overlap with first intermediate opening 38. As a result, a new, diverting outlet or opening for the heated fluid entering assembly 30 is provided. A skirt 37 surrounding the outlet side of the diverting opening guides the fluid in the intended direction. The volume of heated fluid or steam reaching outlet 46 is reduced or eliminated.

Although the diverter valve assembly is shown with two conduit members, it is envisioned that more or less members may be provided. For example, a third member may connect two other valve members. The movement of the showerhead may be connected to this third member. An aperture in the third member would selectively align with an aperture in one or both of the first and second members. As such, the second member does not necessarily rotate relative to the first member. In addition, the second member described above may surround the first member.

Figure 3:
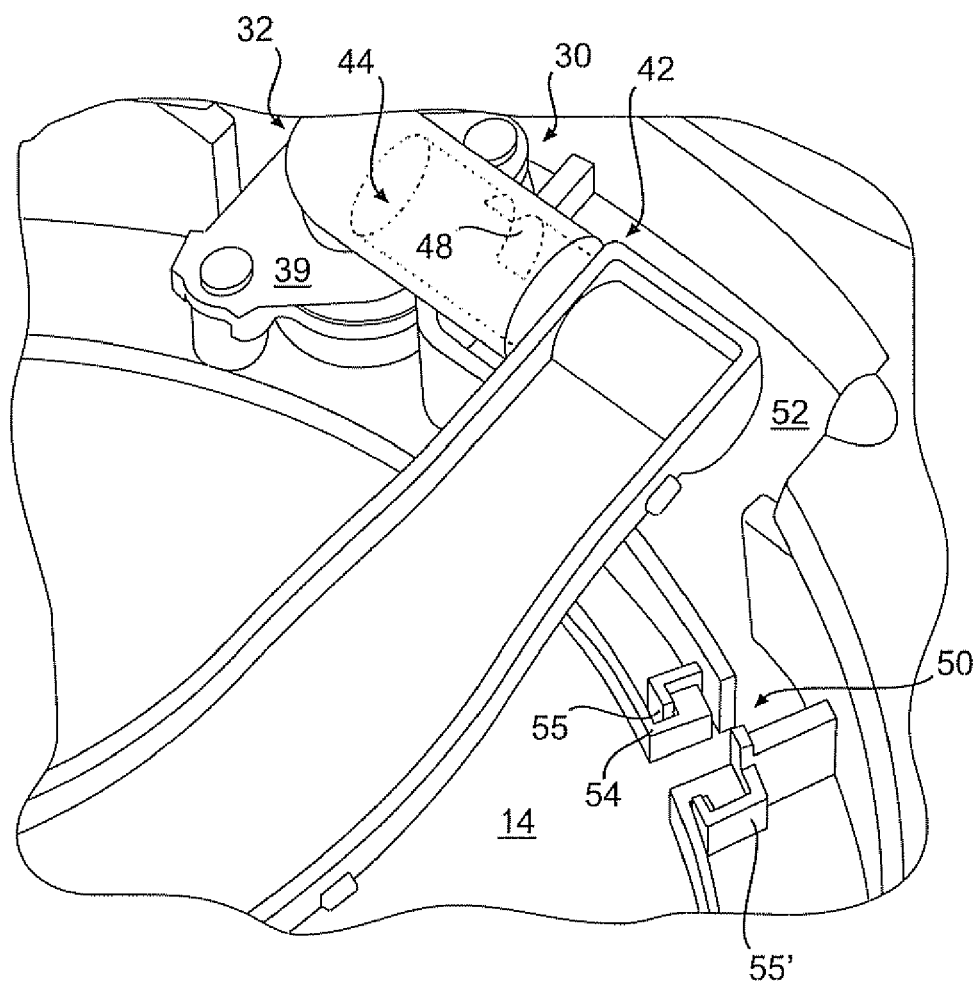
FIG. 3 is a magnified view of one embodiment of the diverter valve assembly and fluid channel in accordance with the present invention.

Turning now to FIG. 3, there is illustrated a close-up view of assembly 30 mounted to a stand 12 in the closed position. As best illustrated in FIG. 3, the diverting opening and optional skirt 37 (not visible in FIG. 3) direct heated fluid into a channel 50. Channel 50 may include a catch basin 52. The shape of catch basin 52 can vary depending on the specific design of stand 12 or the size and shape of assembly 30. The basin is generally characterized by sidewalls defining a partially enclosed space operable to contain fluid ejected from the diverting opening. Ideally, the sidewalls and optional skirt 37 would be effective to reduce or eliminate fluid splashing from or around the basin.

Fluid in optional basin 52 is transmitted to filter basket 14 via channel 50. The channel has an outlet that is downstream of the showerhead in a typical brew cycle. Therefore, the diverted fluid can be directed by the channel to the filter basket or to a reservoir or receptacle that would hold the brewed beverage. In one preferred embodiment, the channel directs the flow of diverted fluid through an outlet connecting the channel to the filter basket. In another embodiment of the present invention, the filter basket is securely and selectively held proximate to the channel outlet via a tab-and-receiver arrangement. The filter basket, in this embodiment, includes a tab that engages a specifically shaped receiver. When engaged, the receiver holds the tab, and thus the filter basket, in a proper alignment to receive fluid from the channel. The tab also acts as a bridge that transmits fluid from the channel to the basket with a reduced amount of leakage between the channel outlet and the filter basket.

In one example of the tab-and-receiver arrangement, a tab 54 (as best seen in FIG. 3) vertically slides into opposing slots 55, 55' provided by the beverage maker proximate to the channel outlet. The slots act as the receiver that properly aligns the filter basket and reduces leakage of the diverted fluid at the exchange of the fluid from the channel to the filter basket.

It is again noted that channel 50 may direct the diverted fluid to any point downstream of the showerhead in the brew cycle. For example, channel 50 might bypass the filter basket so that diverted fluid is directed to a brewed beverage storage tank or receptacle without passing through the filter basket. This forward movement of the diverted fluid in the brew cycle is unique relative to the idea of directing the diverted fluid backward or upstream in the process as when known beverage makers direct the diverted fluid back into the fresh water reservoir. The diverter valve and channel of the present invention allows for an efficient diverter assembly that is operable with beverage makers that include removable fresh water reservoirs.

It is necessary for the operator to prime or prepare the beverage maker for use. Water must be added to the fresh water reservoir (either an integrated or removable reservoir), the filter basket must be installed into the stand, an infusible material must be added to the basket, and the tank must be installed onto the stand (where applicable). A paper or permanent filter can be used with the filter basket. The operator closes the lid before turning the beverage maker on.

In use, diverting valve 30 opens the diverting opening when the user lifts lid 18. Fluid or steam that would otherwise be ejected from showerhead 20 is caught in channel 50 or basin 52 and transmitted to basket 14 via channel 50. Given the construction of the present invention, previously required access of the diverted fluid to the fresh water reservoir is eliminated.

The specific materials, size, shape, or other features of the disclosed invention may be modified as desired or necessary. For instance, in another preferred embodiment, second conduit 42 could surround outlet 36 of first conduit 32 as opposed to being inserted into outlet 36. Optional skirt 37 would, therefore, be placed on second conduit 42 so that the rotation of second conduit 42 necessary to open the diverting opening would result in the skirt being aligned towards basin 52.

Thus, while the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A beverage maker comprising:
   a fresh water reservoir, a heater, a showerhead, the fresh water reservoir, heater and showerhead being fluidly connected, and a brew cycle moving fluid from the fresh water reservoir, to the heater, the showerhead and a brewed beverage tank;
   a selectively opened diverter valve assembly, the diverter valve assembly fluidly connected to the heater and to the showerhead;
   a channel, the channel including an outlet; and
   wherein opening the diverter valve assembly diverts fluid to the channel via the diverter valve assembly, the diverted fluid passing through the channel outlet to a filter basket or to the brewed beverage tank in order to bypass the showerhead.

2. The beverage maker of claim 1, the diverter valve assembly further comprising a first conduit member with an inlet, an outlet, and a first intermediate opening located between the inlet and outlet; and a second conduit member with an inlet, an outlet, and a second intermediate opening located between the inlet and outlet, the second member fluidly connected to the first member wherein the second member rotates relative to the first member to selectively overlap the first and second intermediate openings in order to open the diverter valve assembly and no portion of the first and second intermediate openings overlapping when the valve is in a closed position.

3. The beverage maker of claim 2, further comprising a skirt surrounding the first intermediate opening.

4. The beverage maker of claim 2, wherein the inlet of the second conduit member nests and rotates within the outlet of the first conduit member.

5. The valve described in claim 2, wherein the inlet and outlet of the first conduit member are perpendicular to one another.

6. The valve described in claim 5, wherein the inlet and outlet of the second conduit member are perpendicular to one another.

7. The valve described in claim 2, wherein the inlet and outlet of the second conduit member are perpendicular to one another.

8. The beverage maker of claim 1, wherein the channel further comprises a basin.

9. The beverage maker of claim 1, further comprising a filter basket receiver and the filter basket providing a tab that selectively engages the receiver.

10. The beverage maker of claim 9, wherein the receiver comprises a first slot and a second slot, the first and second slots proximate to the channel outlet and the tab selectively insertable into the first and second slots.

11. The beverage maker of claim 1, wherein the fresh water reservoir further comprises a selectively removable fresh water reservoir.

12. The beverage maker of claim 1, wherein the diverter valve assembly is integral with the showerhead.

13. A method for diverting fluid during the brew cycle of a brewed beverage maker with a rotatable showerhead, the method comprising:

supplying a fluid to be brewed to the beverage maker;

beginning a brew cycle, the brew cycle activating a heater that causes the fluid to move through a conduit to the rotatable showerhead, a filter basket, and a brewed beverage tank;

placing a diverter valve assembly between the heater and the showerhead, the diverter valve assembly fluidly connected to both the heater and the showerhead;

selectively opening the diverter valve assembly wherein opening the diverter valve assembly diverts fluid passing through the diverter valve assembly into a channel; and directing the fluid in the channel to the filter basket or the brewed beverage tank.

14. A brewed beverage maker comprising:

a heater and a showerhead and a fluid tube fluidly connecting the heater and the showerhead, the fluid tube further comprising a valve, the valve comprising a first conduit member and a second conduit member fluidly connected to the first member wherein the second member rotates relative to the first member, the first and second conduit members conveying a flow of fluid;

the hot beverage maker further comprising a channel; and means for diverting the flow of fluid into the channel upon rotation of the first and second conduit members relative to each other, the channel including an outlet for directing fluid to a filter basket or a brewed beverage tank.

15. The brewed beverage maker of claim 14, the beverage maker further comprising a fresh water reservoir and the channel further comprising a basin to capture fluid diverted from the flow of fluid.

* * * * *